US012609352B2

(12) United States Patent
Hao et al.

(10) Patent No.: US 12,609,352 B2
(45) Date of Patent: Apr. 21, 2026

(54) EMULSION, EMULSION GEL ELECTROLYTE, AEROGEL, AS WELL AS PREPARATION METHOD AND USE

(71) Applicant: SHANDONG UNIVERSITY, Jinan (CN)

(72) Inventors: Jingcheng Hao, Jinan (CN); Wenna Wu, Jinan (CN); Xiaoli Chen, Jinan (CN); Li Liu, Jinan (CN); Shuli Dong, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 794 days.

(21) Appl. No.: 17/916,880

(22) PCT Filed: Nov. 10, 2021

(86) PCT No.: PCT/CN2021/129897
§ 371 (c)(1),
(2) Date: Oct. 4, 2022

(87) PCT Pub. No.: WO2023/284201
PCT Pub. Date: Jan. 19, 2023

(65) Prior Publication Data
US 2024/0322230 A1 Sep. 26, 2024

(30) Foreign Application Priority Data

Jul. 14, 2021 (CN) .......................... 202110794432.4

(51) Int. Cl.
| | |
|---|---|
| *H01M 10/0565* | (2010.01) |
| *C09K 11/02* | (2006.01) |
| *C09K 11/77* | (2006.01) |
| *H01G 11/26* | (2013.01) |
| *H01G 11/48* | (2013.01) |
| *H01G 11/56* | (2013.01) |

(52) U.S. Cl.
CPC ....... *H01M 10/0565* (2013.01); *C09K 11/025* (2013.01); *C09K 11/7773* (2013.01); *H01G 11/26* (2013.01); *H01G 11/48* (2013.01); *H01G 11/56* (2013.01); *H01M 2300/0082* (2013.01); *H01M 2300/0085* (2013.01)

(58) Field of Classification Search
CPC .. C09K 11/025; C09K 11/7773; H01G 11/26; H01G 11/48; H01G 11/56; G01M 10/0565; G01M 2300/0082; G01M 2300/0085; G01M 2004/021; G01M 4/602; G01M 4/62; G01M 6/181
See application file for complete search history.

(56) References Cited

U.S. PATENT DOCUMENTS

| | | | |
|---|---|---|---|
| 2009/0173381 A1 | 7/2009 | Kang et al. | |
| 2017/0166806 A1 | 6/2017 | Roscini et al. | |
| 2017/0166807 A1* | 6/2017 | Kuzumoto | .......... C09K 11/025 |
| 2017/0225141 A1 | 8/2017 | Schotten et al. | |

FOREIGN PATENT DOCUMENTS

| | | | |
|---|---|---|---|
| CN | 109904010 A | | 6/2019 |
| CN | 110591450 A | | 12/2019 |
| CN | 112185712 A | | 1/2021 |
| CN | 112420403 | * | 2/2021 |
| CN | 112420403 A | | 2/2021 |
| CN | 113480682 A | | 10/2021 |
| WO | WO-2016059019 A2 | * | 4/2016 |
| WO | WO-2016124555 A1 | * | 8/2016 |

OTHER PUBLICATIONS

Nan et al.; "Preparation of Ionic Liquid-based Gel Electrolytes and Application in Supercapacitors;" Chemistry and Industry of Forest Products; 2020; pp. 17-23; vol. 40, No. 4.
Mar. 29, 2022 Search Report issued in International Patent Application No. PCT/CN2021/129897.
Mar. 29, 2022 Written Opinion of the International Searching Authority issued in International Patent Application No. PCT/CN2021/129897.

* cited by examiner

*Primary Examiner* — C Melissa Koslow
(74) *Attorney, Agent, or Firm* — Oliff PLC

(57) ABSTRACT

An emulsion, an emulsion gel electrolyte, an aerogel, as well as a preparation method and a use; wherein the emulsion is an oil-in-water emulsion. An oil phase is a solution of decane dispersed with an upconversion nanomaterial and a water phase contains a polymerizable ionic liquid. The gel electrolytes and aerogel electrode materials prepared based on this emulsion have greatly improved the electrochemical performance of supercapacitors.

9 Claims, 4 Drawing Sheets

Increase the concentration of UCNPs

EMULSION, EMULSION GEL ELECTROLYTE, AEROGEL, AS WELL AS PREPARATION METHOD AND USE

TECHNICAL FIELD

The present disclosure belongs to the technical field of energy devices, and specifically relates to an emulsion, an emulsion gel electrolyte, an aerogel, as well as a preparation method and a use.

BACKGROUND

Information of the Related Art part is merely disclosed to increase the understanding of the overall background of the present invention, but is not necessarily regarded as acknowledging or suggesting, in any form, that the information constitutes the prior art known to a person of ordinary skill in the art.

Supercapacitor is a novel and green energy storage device between batteries and traditional capacitors, with the advantages such as high power density, fast charging and discharging, and long cycle life, and thus have broad applications in the fields such as information technology, consumer electronics, and electric vehicles. A complete double-layer supercapacitor consists of two electrodes, which are connected with an electrolyte. Depending on the different needs of supercapacitors, the selection of electrolytes and electrode materials is crucial. Firstly, in terms of electrolytes, compared to traditional liquid electrolytes, solid electrolytes not only avoid safety issues such as leakage and volatilization, but also greatly reduce packaging costs and provide more design options for novel device configurations.

However, the application of solid electrolytes in capacitors is somewhat limited because of the low conductivity of most solid electrolytes at room temperature and the poor contact between electrodes/electrolytes. Conventional gel polymer electrolytes suffer from low ionic conductivity and poor diffusion ability, which leads to low specific capacity and energy density of capacitors. Secondly, the preparation of electrode materials is also crucial. Conventional electrode materials have higher resistance, which severely reduces the energy output of the capacitor and thus prevents high performance supercapacitors from being obtained. Therefore, how to increase the electrochemical performance of supercapacitors through the improvement of electrolytes and electrode materials has become an urgent technical problem to be solved.

SUMMARY

The present inventors found that constructing gel polymer electrolytes based on ionic liquids is beneficial to solving the above problems. Ionic liquids as solvents have the advantages such as high ionic conductivity and wide electrochemical window, in addition to the advantages such as non-volatility, non-combustibility and good thermal stability compared with traditional water or organic solvents. Meanwhile, the three-dimensional porous structure provides a large specific surface area for the electrode materials. The layered porous structure facilitates the immersion of electrolyte ions. Moreover, the porous structure can promote electron transport, leading to low resistance and high capacitance.

In order to solve the above problems in the prior art, the present disclosure provides an emulsion, an emulsion gel electrolyte, an aerogel, as well as a preparation method and a use. Gel electrolytes and aerogel electrode materials prepared based on this emulsion have greatly improved the electrochemical performance of supercapacitors.

Specifically, the technical solutions according to the present disclosure are described as follows.

In a first aspect according to the present disclosure, an emulsion is provided, the emulsion being an oil-in-water emulsion, an oil phase being a solution of decane dispersed with an upconversion nanomaterial, and a water phase containing a polymerizable ionic liquid.

In a second aspect according to the present disclosure, a method for preparing the emulsion is provided, including: dispersing the upconversion nanomaterial in decane, then adding an aqueous solution of the ionic liquid and homogenizing to obtain the oil-in-water emulsion; further, the ionic liquid has a concentration of 0.36-3.3 mol/L, further, the upconversion nanomaterial having a mass fraction of 0.8±0.05%, and further, the homogenization time being 3-5 min.

In a third aspect according to the present disclosure, an emulsion gel electrolyte is provided, the emulsion gel electrolyte being formed by polymerization and cross-linking of the emulsion and a cross-linking agent in the presence of a photoinitiator, and the ionic liquid of the emulsion having a number of carbon chains in the range of 4-14.

In a fourth aspect according to the present disclosure, an aerogel is provided, the aerogel being obtained by forming an emulsion gel by polymerization and cross-linking of the emulsion and a cross-linking agent in the presence of a photoinitiator, and then freeze-drying the emulsion gel, the ionic liquid of the emulsion having a number of carbon chains in the range of 4-14.

In a fifth aspect according to the present disclosure, an electrode material is provided, the electrode material being the aerogel.

In a sixth aspect according to the present disclosure, a solid battery is provided, including a positive electrode, a negative electrode, and a solid electrolyte provided between the positive and negative electrodes and in contact with the positive and negative electrodes, separately, the solid electrolyte being the emulsion gel electrolyte.

In a seventh aspect according to the present disclosure, a supercapacitor is provided, including a positive electrode, a solid electrolyte and a negative electrode, the solid electrolyte being the emulsion gel electrolyte.

In an eighth aspect according to the present disclosure, use of the supercapacitor in information technology, electric vehicles, and consumer electronics is provided.

One or more of the technical solutions according to the present disclosure has the following beneficial effects:

(1) In some examples, the characterization of zeta potential demonstrates that the upconversion nanoparticles are positively charged and have a potential value of 40.2 mV, indicating that the nanoparticles are stably dispersed in the solvent and that they can be uniformly dispersed in decane as the organic solvent due to the hydrophobic oleic acid ligands on the surface of the upconversion nanoparticles.

(2) In a novel oil-in-water emulsion formed by ionic liquids, the size of the emulsion droplets decreases as the concentration of ionic liquids increases, again indicating that the size of droplets is controlled by the concentration of ionic liquids in the emulsion synergistically stabilized by upconversion nanoparticles and ionic liquids. In the emulsion synergistically stabilized by UCNP/IL (ionic liquid), there was no obvious profile of the emulsion, indicating that in the O/W emulsion synergistically stabilized by UCNP/IL, the hydrophobic UCNPs may be distributed at the inner interface of the oil droplets due to their surface wettability, and synergistically stabilize the emulsion with the ionic liquids.

(3) The emulsion gel prepared based on the novel oil-in-water emulsion is used as an electrolyte, and the conductivity increases with increasing temperature. At low temperatures of 0° C. and −20° C., the change in conductivity tends to be stable and still maintains a certain level of conductivity, indicating that the emulsion gel as a solid electrolyte is suitable for a wide temperature range.

(4) The emulsion gel electrolytes and aerogel electrode materials prepared based on the novel oil-in-water emulsion have strong mechanical properties, and the maximum stresses can reach 3.9 MPa and 0.37 MPa, respectively, indicating that both aerogel and emulsion gel have strong mechanical properties. Not only that, it also has excellent thermal stability, which can be maintained at 250° C., indicating that the emulsion gel and aerogel have very low flammability and good thermal stability, which is important for improving the safety of the supercapacitor.

(5) The electrochemical performance of the supercapacitor prepared based on the above emulsion gel electrolyte and aerogel electrode material is greatly improved, and the specific capacity can reach up to 15.6 F/g and energy density up to 8.67 Wh/Kg when the current density is 0.13 A/g. The existing supercapacitors have a maximum specific capacity of 4.7 F/g and a maximum energy density of 0.43 Wh/Kg at a current density of 0.4 A/g (Supercapacitors Based on Three-Dimensional Hierarchical Graphene Aerogels with Periodic Macropores).

BRIEF DESCRIPTION OF THE DRAWINGS

The accompanying drawings that constitute a part of the present disclosure are used to provide a further understanding of the present disclosure. Exemplary embodiments of the present disclosure and descriptions of the embodiments are used to explain the present disclosure, and do not constitute any inappropriate limitation to the present disclosure.

Hereinafter, embodiments of the present disclosure are described in detail in connection with the accompanying drawings, wherein.

DETAILED DESCRIPTION

Figure 1:
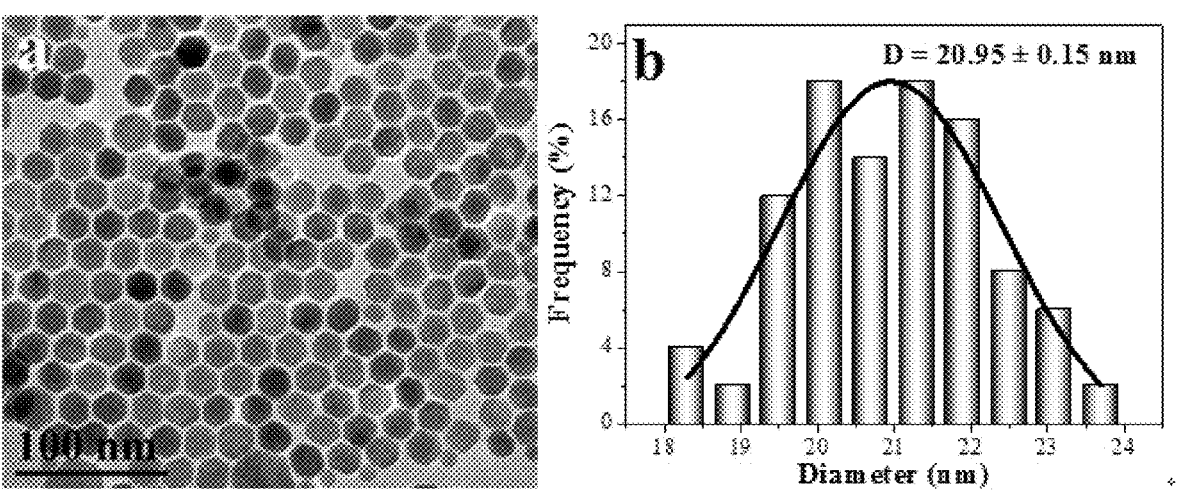
FIG. 1A is an image showing the morphology of upconversion nanoparticles prepared in Example 1.
FIG. 1B is a graph showing the size distribution of upconversion nanoparticles prepared in Example 1.

The present disclosure is further described below with reference to specific embodiments. It should be understood that these embodiments are only for illustrating the present disclosure and are not intended to limit the scope of the present disclosure. In the following examples, experimental methods without specific conditions are usually in accordance with conventional conditions or conditions suggested by the manufacturer.

Unless otherwise defined, all professional and scientific terms used herein have the same meanings as those familiar to those skilled in the art. The reagents or raw materials used in the present invention can be purchased through conventional channels. Unless otherwise specified, the reagents or raw materials used in the present invention are used in a conventional manner in the art or in accordance with product instructions. In addition, any methods and materials similar or equivalent to those described can be used in the methods of the present invention. Methods and materials of preferred embodiments described herein are provided for illustrative purposes only.

It should be noted that terms used herein are only for describing specific implementations and are not intended to limit exemplary implementations according to the present disclosure. As used herein, the singular form is intended to include the plural form, unless the context clearly indicates otherwise. In addition, it should be further understood that terms "comprise" and/or "include" used in this specification indicate that there are features, steps, operations, and/or combinations thereof.

Currently, conventional gel polymer electrolytes suffer from low ionic conductivity and poor diffusion ability, which leads to low specific capacity and energy density of capacitors. Secondly, conventional electrode materials have high resistance, which severely reduces the energy output of the capacitor and thus prevents high performance supercapacitors from being obtained. To this end, the present disclosure provides an emulsion, an emulsion gel electrolyte, an aerogel, as well as a preparation method and a use.

In one embodiment according to the present disclosure, an emulsion is provided. The emulsion is an oil-in-water emulsion. An oil phase is a solution of decane dispersed with upconversion nanomaterials, and a water phase contains a polymerizable ionic liquid.

It is generally believed that inorganic nanoparticles with a certain surface charge can interact with ionic surfactants with opposite charges by electrostatic attraction, so that the surface of inorganic nanoparticles is hydrophobized in situ, and then the hydrophobized nanoparticles with certain wettability can be adsorbed to the fluid interface to stabilize Pickering emulsions or Pickering foams. However, the interaction between inorganic nanoparticles and ionic surfactants with the identical charges has not yet received much attention and there are few relevant research systems because it is widely believed that there is almost no interaction between the two due to their identical charges, especially because the surface properties of the particles are not affected by the ionic surfactants with the identical charges. Secondly, the selection of inorganic nanoparticles is only limited to common commercial nanoparticles, and the exploration of nanoparticle functionality is rare. Meanwhile, the selection of ionic surfactants is also limited to a quaternary ammonium salt type, and the development of functionality is lacking.

However, the present disclosure develops a novel emulsion that is synergistically stabilized by functional upconversion nanomaterials and ionic surface-active ionic liquids with the identical charges, which is more stable and better dispersed, improving the application value of the novel emulsion.

Compared with other oil-in-water systems, the novel emulsion has the advantage that the content of a stabilizer required is lower, which reduces cost and environmental pollution. At the same time, upconversion nanoparticles are introduced. The photovoltaic properties of the upconversion nanoparticles are used for endowing the novel emulsion with corresponding photoelectric conversion functionality.

In one embodiment according to the present disclosure, the upconversion nanomaterial is selected from $NaGdF_4$: $Yb^{3+}$, $Er^{3+}$ or $NaGdF_4$: $Yb^{3+}$, $Er^{3+}@NaGdF_4$: $Nd^{3+}$ preferably $NaGdF_4$: $Yb^{3+}$, $Er^{3+}@NaGdF_4$: $Nd^{3+}$. $NaGdF_4$: $Yb^{3+}$, $Er^{3+}@NaGdF_4$: $Nd^+$ is used as an upconversion nanomaterial, which is beneficial to realizing efficient photoelectric conversion functionality.

A method for preparing $NaGdF_4$: $Yb^{3+}$, $Er^{3+}@NaGdF_4$: $Nd^{3+}$ includes the steps:

mixing $Gd(CH_3COO)_3 \cdot H_2O$, $Yb(CH_3CO_2)_3 \cdot 4H_2O$, and $Er(CH_3CO_2)_3 \cdot 4H_2O$, reacting using oleic acid as a ligand and 1-octadecene as a solvent at 100-200° C. for 1-3 h to obtain $Ln^{3+}$-OA organometallic precursors when the color of the solution changes to light yellow; then adding $NH_4F$ in methanol and NaOH in methanol, and reacting at 40-60° C.; when the solution becomes clarified, continuing to increase the temperature to 100-130° C., and reacting for 1-3 h; then placing in an electric jacket, nucleating and growing at 250-350° C., during which the solution becomes golden yellow; cooling and purifying to obtain $NaGdF_4$: $Yb^{3+}$, $Er^{3+}$, which is dispersed in 4 ml hexane;
then placing $Gd(CH_3COO)_3 \cdot H_2O$, $Nd(CH_3CO_2)_3 \cdot 6H_2O$, oleic acid and 1-octadecene in a round bottom flask and stirring in an oil bath at 100-150° C. under $N_2$ for 1-2 h; subsequently, injecting the solution of $NaGdF_4$: $Yb^{3+}$, $Er^{3+}$ in hexane as prepared above along with NaOH in methanol and $NH_4F$ in methanol and nucleating at 50-60° C. under $N_2$; continuing to increase the temperature to 100-110° C. and maintaining for 1-3 h to remove the methanol; transferring the round bottom flask to an electric jacket, nucleating and growing at 250-330° C., cooling to room temperature, precipitating with ethanol, and washing with a mixed solvent of hexane:ethanol to obtain a core-shell nanoparticle $NaGdF_4$: $Yb^{3+}$, $Er^{3+}@NaGdF_4$: $Nd^{3+}$.

Further, the upconversion nanomaterial is an upconversion nanomaterial with hydrophobic oleic acid ligand on the surface. On the surface of the upconversion nanomaterial, hydrophobic oleic acid (OA) is used as a stabilizing ligand for preventing the upconversion nanomaterial from aggregating and sinking, so that it has better dispersion.

Alternatively, the ionic liquid is selected from 1-vinyl-3-tetradecylimidazolium bromide ($[VC_{14}Im]Br$), 1-vinyl-3-dodecylimidazolium bromide ($[VC_{12}Im]Br$) or 1-Vinyl-3-butylimidazolium bromide ($[VC_4Im]Br$); preferably, 1-vinyl-3-dodecylimidazolium bromide ($[VC_{12}Im]Br$) or 1-vinyl-3-butylimidazole bromine ($[VC_4Im]Br$). The ionic liquid and the upconversion nanomaterial have the identical charges. The stability of the novel emulsions can be greatly improved though the synergistic effect between upconversion nanomaterials and ionic liquids.

In one embodiment according to the present disclosure, a method for preparing an emulsion is provided, including: dispersing an upconversion nanomaterial in decane, then adding an ionic liquid and reacting to obtain an oil-in-water emulsion. Compared with the preparation of other gel solid electrolytes in the prior art, the preparation method is simpler and more efficient. Further, the ionic liquid has a concentration of 0.36-3.3 mol/L. As the concentration of ionic liquids increases, the size of emulsion droplets decreases. The size of emulsion droplets can be efficiently controlled by controlling the concentration of ionic liquids. Further, the upconversion nanomaterial has a mass fraction of 0.8±0.05%. Further, the reaction time is 20-30 h, and the emulsions prepared under these conditions have the best stability.

In one embodiment according to the present disclosure, an emulsion gel electrolyte is provided. The emulsion gel electrolyte is formed by polymerization and cross-linking of the emulsion and a cross-linking agent in the presence of a photoinitiator. The ionic liquid of the emulsion has a number of carbon chains in the range of 4-14. The number of carbon chains of the ionic liquids within that range facilitates the formation of stable emulsions.

Alternatively, the cross-linking agent is selected from N'N-methylenebisacrylamide, ethylene glycol dimethacrylate or glycerol dimethacrylate; preferably, N'N-methylenebisacrylamide. Alternatively, the ionic liquid is selected from 1-vinyl-3-tetradecylimidazolium bromide ($[VC_{14}Im]Br$), 1-vinyl-3-dodecylimidazolium bromide ($[VC_{12}Im]Br$) or 1-vinyl-3-butylimidazolium bromide ($[VC_4Im]Br$); preferably, 1-vinyl-3-butylimidazolium bromide ($[VC_4Im]Br$). Further, the photoinitiator is selected from azo diisobutyronitrile, 4-hydroxybenzophenone or 2,2-diethoxyacetophenone; preferably, 2,2-diethoxyacetophenone. Alternatively, the time for initiating the polymerization reaction is 10-30 min, preferably, 20 min.

The method for preparing an emulsion gel in which a novel O/W emulsion synergistically stabilized by positively charged upconversion nanomaterials and cationic surface-active ionic liquids is used as a template is simple and efficient. Moreover, the obtained emulsion gels have higher mechanical properties and stability, and have higher ionic conductivity and diffusion ability, which can enhance the electrochemical performance of supercapacitors.

In one embodiment according to the present disclosure, an aerogel is provided. The aerogel is obtained by forming an emulsion gel by polymerization and cross-linking of the emulsion and a cross-linking agent in the presence of a photoinitiator, and then freeze-drying the emulsion gel. The ionic liquid of the emulsion has a number of carbon chains in the range of 4-14. The number of carbon chains of the ionic liquids within that range facilitates the formation of stable emulsions.

Alternatively, the ionic liquid is selected from 1-vinyl-3-tetradecylimidazolium bromide ([VC$_{14}$Im]Br), 1-vinyl-3-butylimidazolium bromide ([VC$_4$Im]Br) or 1-vinyl-3-dodecylimidazolium bromide ([VC$_{12}$Im]Br); preferably, 1-vinyl-3-dodecylimidazolium bromide ([VC$_{12}$Im]Br).

The aerogel prepared by the above method has a rich pore structure, and the three-dimensional porous structure can achieve higher energy output. The three-dimensional porous structure provides a large specific surface area for the electrode materials. The layered porous structure facilitates the immersion of electrolyte ions. Moreover, the porous structure can promote electron transport, leading to low resistance and high capacitance.

In one embodiment according to the present disclosure, an electrode material is provided. The electrode material is the aerogel. The above aerogel is rich in three-dimensional porous structure and has a larger specific surface area, which effectively promotes the electron transport and has more obvious advantages as an electrode material.

In one embodiment according to the present disclosure, a solid battery is provided, including a positive electrode, a negative electrode, and a solid electrolyte provided between the positive and negative electrodes and in contact with the positive and negative electrodes, separately. The solid electrolyte is the emulsion gel electrolyte. Using the above emulsion gel as an electrolyte can increase the ion transport rate and increase the electrochemical performance of the capacitor.

In one embodiment according to the present disclosure, a supercapacitor is provided, including a positive electrode, a solid electrolyte and a negative electrode. The solid electrolyte is the emulsion gel electrolyte. Supercapacitors with emulsion gel as an electrolyte have higher specific capacity and energy density, showing unique advantages over conventional electrolyte-based supercapacitors.

In one embodiment according to the present disclosure, the positive and negative electrodes are the aerogel and/or the electrode material.

In one embodiment according to the present disclosure, use of the above-indicated supercapacitor in information technology, electric vehicles, and consumer electronics is provided.

In order to enable those skilled in the art to understand the technical solutions of the present disclosure more clearly, the technical solutions of the present disclosure will be described in detail below with reference to specific embodiments.

Example 1

The upconversion nanoparticles NaGdF$_4$: Yb$^{3+}$, Er$^{3+}$ @NaGdF$_4$: Nd$^{3+}$ with hydrophobic oleic acid ligands on the surface were synthesized as follows:

Gd(CH$_3$COO)$_3$·H$_2$O (0.78 mmol, 260.82 mg), Yb(CH$_3$CO$_2$)$_3$·4H$_2$O (0.20 mmol, 84.4 mg) and Er(CH$_3$CO$_2$)$_3$·4H$_2$O (0.02 mmol, 8.33 mg) were placed in a 100 mL three-necked round bottom flask. 10 mL of oleic acid as a stabilizing ligand and 15 mL of 1-octadecene as a high boiling point solvent were added. The mixture was stirred in an oil bath at 150° C. under N$_2$ for 1 h to obtain Ln$^{3+}$-OA organometallic precursors when the color of the solution changed to light yellow. After cooling to room temperature, 7.0 mL of 0.4 mol/L NH$_4$F in methanol and 3.0 mL of 1.0 mol/L NaOH in methanol were mixed quickly in a 15 ml centrifuge tube and quickly injected into the flask with a syringe (they must be injected into the flask quickly at this time, because it was very easy for the NaF formed by the reaction of NH$_4$F and NaOH to stick to the wall of the centrifuge tube). The solution became turbid quickly and was nucleated at 50° C. under N$_2$ for 1 h. The solution became clarified again.

The temperature was continued to be increased to 110° C. and kept for 2 h in order to remove the methanol. The round bottom flask was transferred to an electric jacket (the nucleation and growth temperature has a certain effect on the morphology of the final nanoparticles). The nucleation and growth were carried out at 290° C. for 1.5 h. The solution became golden yellow. After cooling to room temperature, the solution was precipitated by adding 5 ml of ethanol and centrifuged at 8500 r.pm for 5 min. The precipitate was removed and washed three times with a mixed solvent of hexane:ethanol=1:1. The final product NaGdF$_4$: Yb$^{3+}$, Er$^{3+}$ btained was dispersed in 4 ml of hexane and stored.

To enhance the fluorescence properties, core-shell nanoparticles NaGdF$_4$: Yb$^{3+}$, Er$^{3+}$@NaGdF$_4$: Nd$^{3+}$ were prepared. Gd(CH$_3$COO)$_3$·H$_2$O (0.7 mmol, 234.07 mg), Nd(CH$_3$CO$_2$)$_3$·6H$_2$O (0.30 mmol, 429.37 mg), 10 mL of oleic acid and 15 mL of 1-octadecene were placed in a 100 mL three-necked round bottom flask and stirred in an oil bath at 150° C. under N$_2$ for 1 h. Subsequently, the solution of NaGdF$_4$: Yb$^{3+}$, Er$^{3+}$ in hexane as prepared above, NaOH in methanol (2.5 mmol, 5 mL) and NH$_4$F in methanol (2.75 mmol, 2 mL) were mixed, injected and nucleated at 50° C. under N$_2$ for 1 h. The temperature was continued to be increased to 110° C. and kept for 2 h in order to remove the methanol. The round bottom flask was transferred to an electric jacket. The nucleation and growth were carried out at 290° C. for 1.5 h. After cooling to room temperature, the solution was precipitated by adding 5 ml of ethanol and centrifuged at 8500 r.pm for 5 min. The precipitate was removed and washed three times with a mixed solvent of hexane:ethanol=1:1. The final product obtained was dispersed in 4 ml of hexane and stored.

On the surface of core-shell nanoparticles NaGdF$_4$: Yb$^{3+}$, Er$^{3+}$@NaGdF$_4$: Nd$^{3+}$, the hydrophobic oleic acid (OA) was used as a stabilizing ligand for preventing the nanoparticles from aggregating and sinking, so that they have better dispersion as shown in the TEM image (FIG. 1$a$) and an average particle size of 20.95 nm as shown in FIG. 1$b$.

Example 2

A series of novel oil-in-water emulsions were prepared by keeping the concentration of nanoparticles NaGdF$_4$: Yb$^{3+}$, Er$^{3+}$@NaGdF$_4$: Nd$^{3+}$ UCNPs) constant, and sequentially increasing the concentration of the surface-active polyionic liquid [VC$_4$Im]Br.

Figure 2:
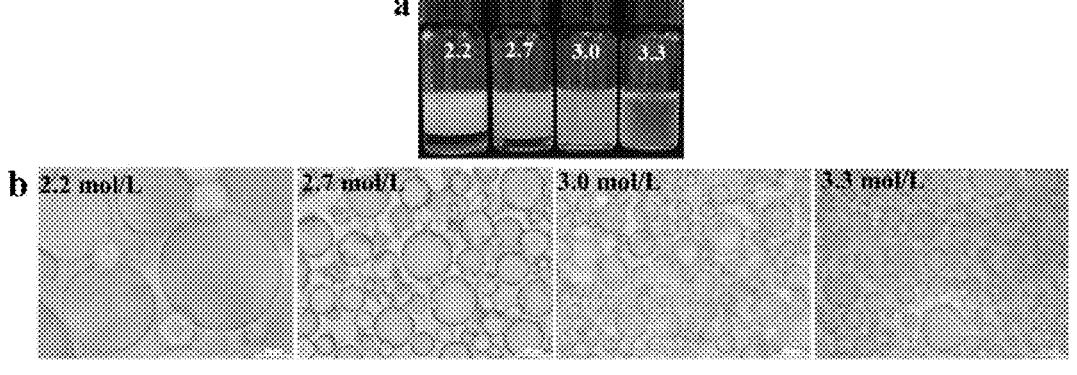
FIG. 2A is a series of photographs of a novel oil-in-water emulsion prepared in Example 2.
FIG. 2B is a series of microscopic images of a novel oil-in-water emulsion prepared in Example 2.

The UCNPs with a mass fraction of 0.8±0.05% were weighed into a glass container. 0.8 mL of decane was added to the container to disperse the UCNPs. Then 1 mL of [VC$_4$Im]Br in water was added to the glass container, subjected to vortex, and stabilized for 24 h before recording the micrographs. The concentrations of UCNPs and [VC$_4$Im]Br were expressed as weight percent (wt %) and molar concentration (mol/L) relative to the oil and water phases, respectively. It can be seen from FIG. 2 that the size of emulsion droplets decreases with increasing [VC$_4$Im]Br concentration. It shows that the size of the droplets is controlled by the concentration of the ionic liquids in the emulsions synergistically stabilized by upconversion nanoparticles and ionic liquids.

Example 3

A series of novel oil-in-water emulsions were prepared by keeping the concentration of nanoparticles NaGdF$_4$: Yb$^{3+}$, Er$^{3+}$@NaGdF$_4$: Nd$^{3+}$ (UCNPs) constant, and sequentially increasing the concentration of the surface-active polyionic liquid [VC$_{12}$Im]Br.

Figure 3:
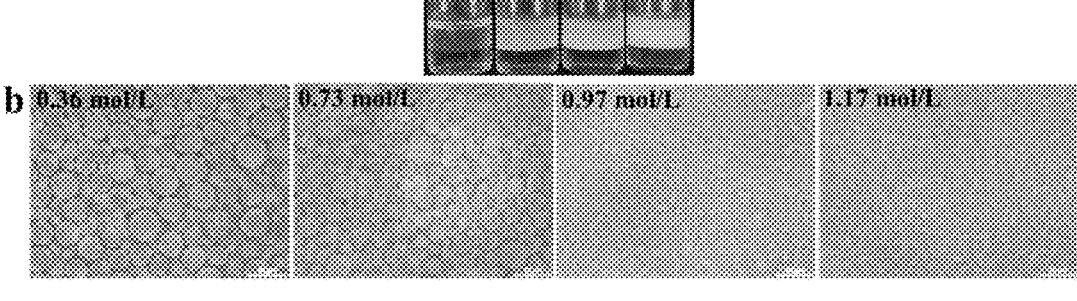
FIG. 3A is a photograph of a novel oil-in-water emulsion prepared in Example 3.
FIG. 3B is a series of microscopic images of a novel oil-in-water emulsion prepared in Example 3.
Figure 4:
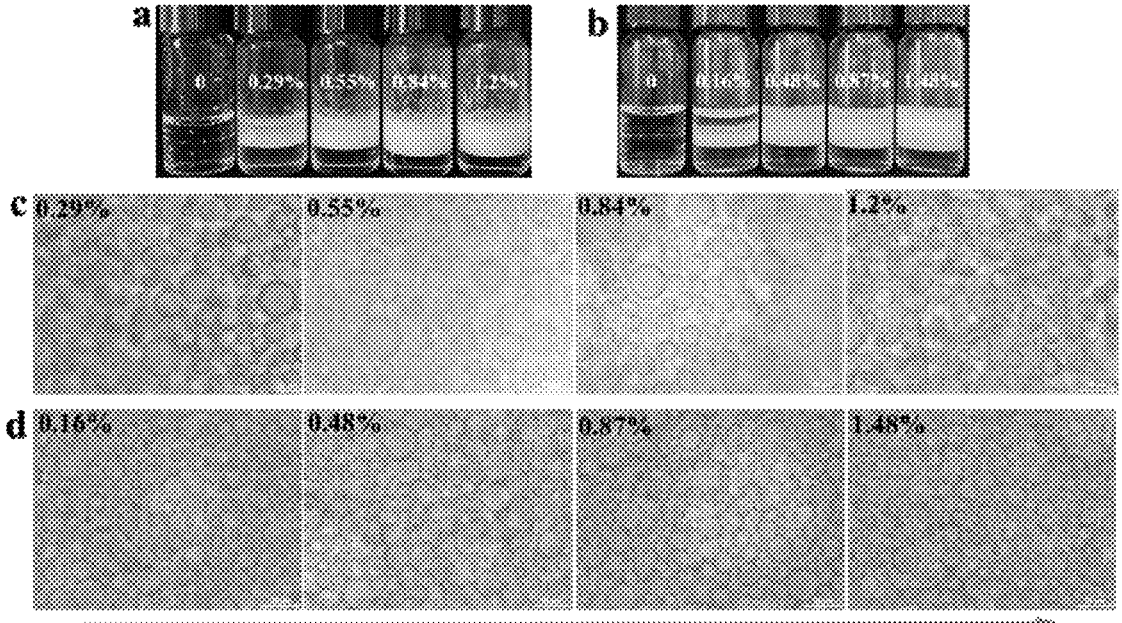
FIG. 4A is a photograph of a first novel oil-in-water emulsion prepared in Example 4.
FIG. 4B is a photograph of a second novel oil-in-water emulsion prepared in Example 4.
FIG. 4C is a series of microscopic images of the novel oil-in-water emulsion of FIG. 4A prepared in Example 4.
FIG. 4D is a series of microscopic images of the novel oil-in-water emulsion of FIG. 4B prepared in Example 4.

The UCNPs with a mass fraction of 0.8±0.05% were weighed into a glass container. 0.8 mL of decane was added to the container to disperse the UCNPs. Then 1 mL of [VC$_{12}$Im]Br in water was added to the glass container, subjected to vortex, and stabilized for 24 h before recording the micrographs. It can be seen from FIG. 3 that the size of emulsion droplets decreases with increasing [VC$_{12}$Im]Br concentration. It also shows that the size of the droplets is controlled by the concentration of the ionic liquids in the emulsions synergistically stabilized by upconversion nanoparticles and ionic liquids.

Example 4

A series of novel oil-in-water emulsions were prepared by keeping the concentration of ionic liquid constant, and sequentially increasing the concentration of UCNPs.

Figure 5:
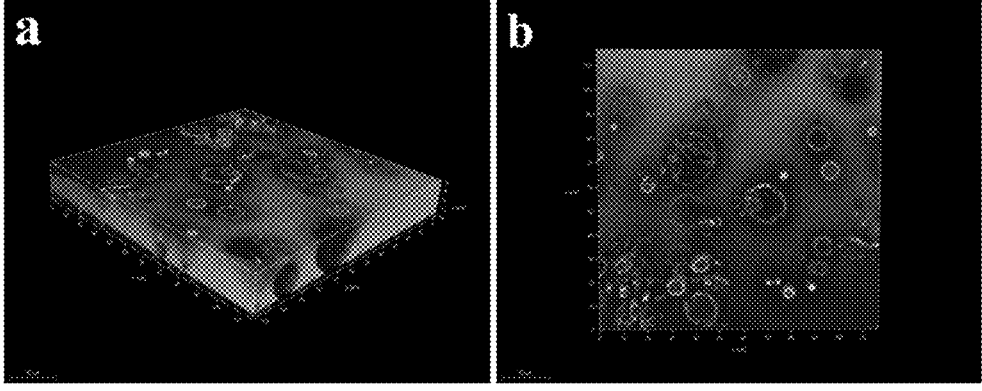
FIG. 5A is a laser confocal microscopy photograph of a first novel oil-in-water emulsion of FIG. 4A prepared in Example 4.
FIG. 5B is a laser confocal microscopy photograph of a second novel oil-in-water emulsion of FIG. 4B prepared in Example 4.

The UCNPs with different mass fractions were weighed into a glass container. 0.8 mL of decane was added to disperse the UCNPs. Then 1 mL of [VC$_{12}$Im]Br (at a concentration of 0.73 mol/L), or 1 mL of [VC$_4$Im]Br (at a concentration of 3.3 mol/L) was added, subjected to vortex, and stabilized for 24 h before recording the micrographs. As can be seen from FIG. 4a and FIG. 4c or FIG. 4b and FIG. 4d, for both ionic liquid systems, there is no significant change in the size of the emulsion droplets with increasing mass fractions of UCNPs. It shows that the size of the droplets is independent of the concentration of nanoparticles in the emulsions synergistically stabilized by upconversion nanoparticles and ionic liquids. The microscopic morphology of the emulsions was further characterized by laser confocal microscopy. It can be seen in FIG. 5 that the emulsion type is oil-in-water in the emulsions synergistically stabilized by UCNP/IL. Moreover, there is no obvious profile of the emulsion, indicating that in the O/W emulsions synergistically stabilized by UCNP/IL, the hydrophobic UCNPs may be distributed at the inner interface of the oil droplets due to their certain surface wettability, and synergistically stabilize the emulsion with the ionic liquids.

Example 5

Preparation of Emulsion Gels Using Novel O/W Emulsions as Templates:

The UCNPs (NaGdF$_4$: Yb$^{3+}$, Er$^{3+}$@NaGdF$_4$: Nd$^{3+}$) prepared in Example 1 were weighed into a glass container as the upconversion nanoparticles at a mass fraction of 0.8±0.05%. 0.8 mL of decane was added to the container to disperse the UCNPs. Then 1 mL of 2.2 mol/L polymerizable surface-active ionic liquid [VC$_4$Im]Br in water was added to the glass container, subjected to vortex, and stabilized for 24 h to obtain the novel O/W emulsion.

The emulsion gel was formed by using the novel O/W emulsion as a template, adding N'N-methylenebisacrylamide as a cross-linking agent and 2,2-diethoxyacetophenone as a photoinitiator to the aqueous phase, using the continuous-phase polyionic liquid [VC$_4$Im]Br as a monomer, and polymerizing and cross-linking the continuous-phase of the emulsion with UV initiation for 20 min.

Figure 6:
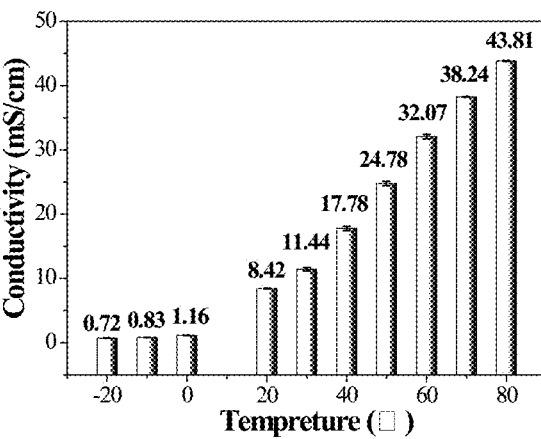
FIG. 6 is a graph showing temperature dependence of the conductivity of an emulsion gel prepared in Example 5.

The variable temperature conductivity of the emulsion gel as an electrolyte was tested. It can be seen in FIG. 6 that the conductivity increases with increasing temperature since the warming promotes the migration of ions, which in turn enhances the conductivity. At low temperatures of 0° C. and −20° C., the change in conductivity tends to be stable and still maintains a certain level of conductivity. It shows that the emulsion gel as a solid electrolyte is suitable for a wide temperature range.

Example 6

Preparation of Aerogels Using Novel O/W Emulsions as Templates:

The UCNPs (NaGdF$_4$: Yb$^{3+}$, Er$^{3+}$@NaGdF$_4$: Nd$^{3+}$) prepared in Example 1 were weighed into a glass container as the upconversion nanoparticles at a mass fraction of 0.8±0.05%. 0.8 mL of decane was added to the container to disperse the UCNPs. Then 1 mL of 2.2 mol/L polymerizable surface-active ionic liquid [VC$_{12}$Im]Br in water was added to the glass container, subjected to vortex, and stabilized for 24 h to obtain the novel O/W emulsion.

The emulsion gel was formed by using the novel O/W emulsion prepared as a template, adding N'N-methylenebisacrylamide as a cross-linking agent and 2,2-diethoxyacetophenone as a photoinitiator to the aqueous phase, using the continuous-phase polyionic liquid [VC$_{12}$Im]Br as a monomer, and polymerizing and cross-linking the continuous-phase of the emulsion with UV initiation for 20 min. The emulsion gel was subsequently freeze-dried to obtain a porous aerogel.

Figure 7:
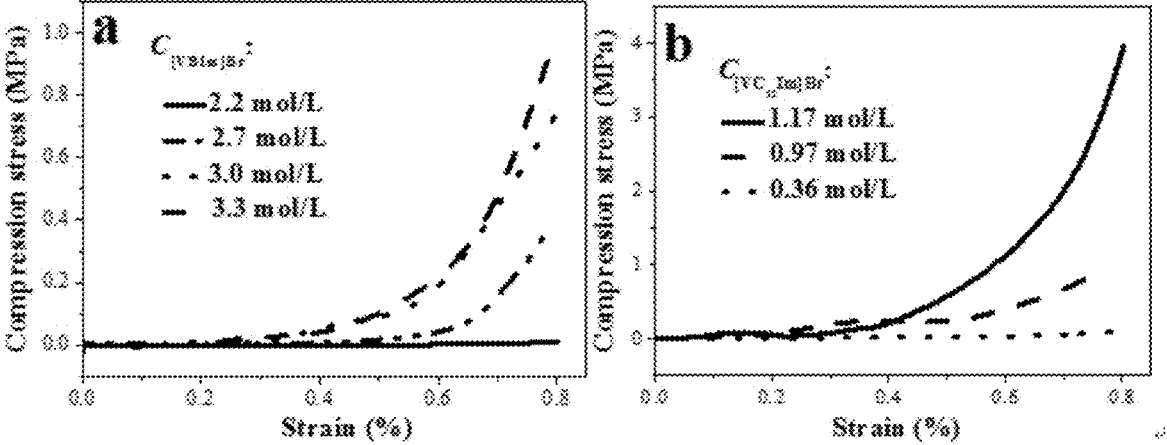
FIG. 7A is a graph showing compression stress curves for the emulsion gel and aerogel prepared in Example 5.
FIG. 7B is a graph showing compression stress curves for the emulsion gel and aerogel prepared in Example 6.

In practical applications, especially in devices, good mechanical properties of aerogel electrode materials and gel electrolytes are essential. Therefore, the compressive properties were investigated, as shown in FIG. 7, the strain of the sample was fixed at 80% during the test. The compression stress was tested for different polyionic liquid concentrations, and the maximum stresses could reach 0.37 MPa and 3.9 MPa, respectively, indicating that both aerogels and emulsion gels have strong mechanical properties.

Figure 8:
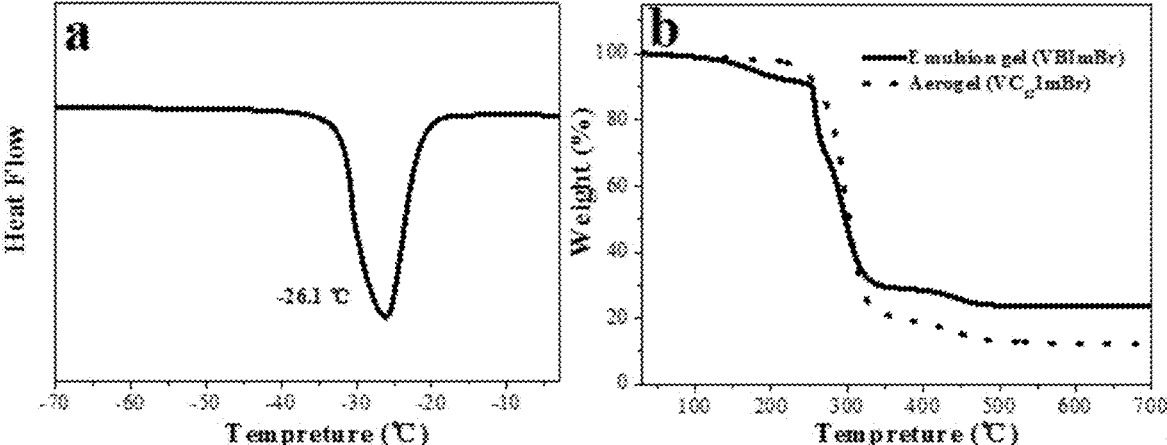
FIG. 8A is a graph showing differential scanning calorimetric and thermal stability curves for the emulsion gel prepared in Example 5.
FIG. 8B is a graph showing differential scanning calorimetric and thermal stability curves for the emulsion gel prepared in Example 6.

To investigate the freezing resistance of the emulsion gel, a differential scanning calorimetry (DSC) test was performed on the sample. It can be seen from FIG. 8a that the freezing point of the emulsion gel is −26.1° C. Then the thermal stability of emulsion gels and aerogels was tested by TGA. It can be seen from FIG. 8b that both of emulsion gels and aerogels can maintain the thermal stability at 250° C., indicating that they have very low flammability and good thermal stability, which is important to improve the safety of the supercapacitor.

Example 7

Preparation and Electrochemical Performance Test of Supercapacitors.

An all-solid-state symmetrical supercapacitor was formed by using the emulsion gels prepared in Example 5 as solid electrolytes, using the porous aerogels prepared in Example 6 as electrode materials for the positive and negative electrodes, and assembling in a button cell case.

Figure 9:
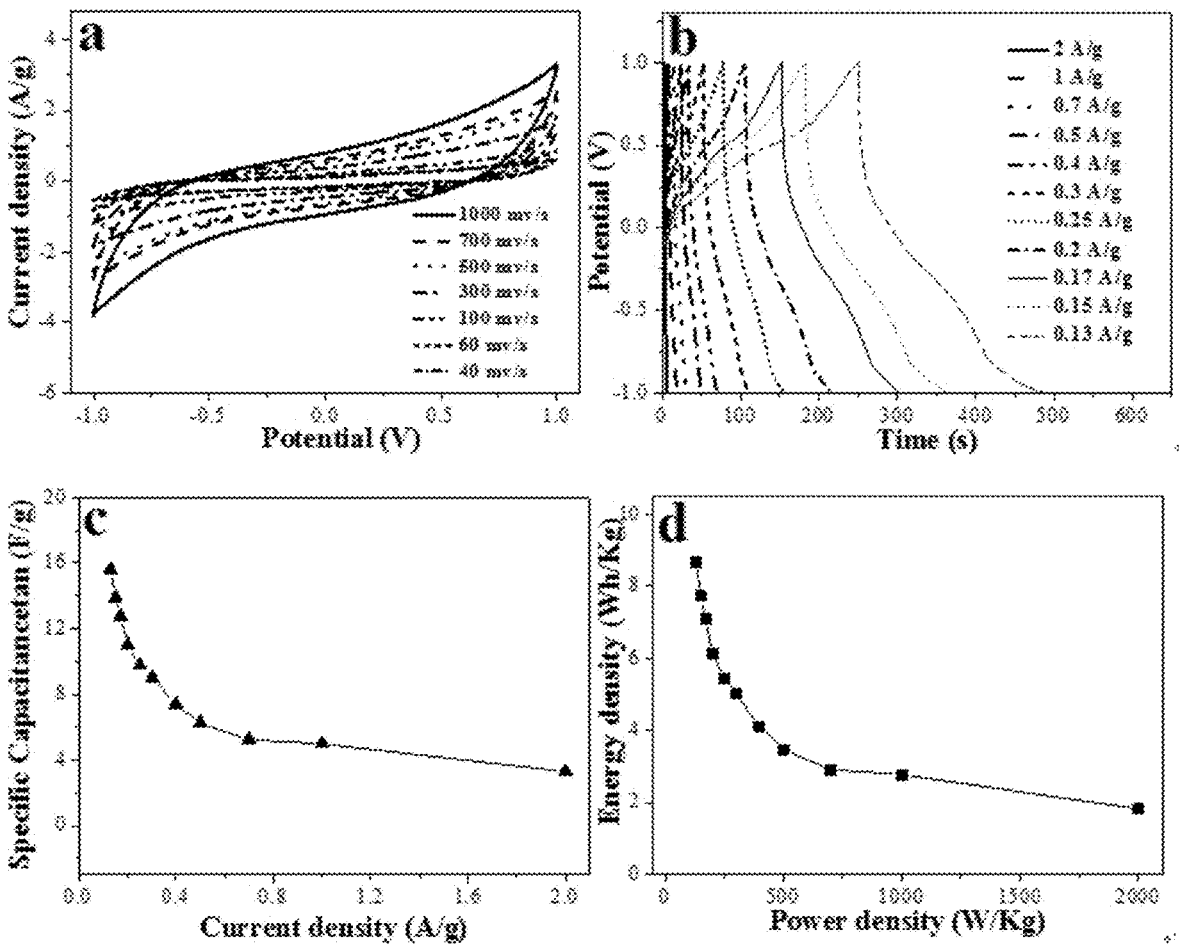
FIG. 9A is a graph showing cyclic voltammetric curves of an all-solid-state supercapacitor of Example 7.
FIG. 9B is a graph showing galvanostatic charge-discharge curves of an all-solid-state supercapacitor of Example 7.
FIG. 9C is a graph showing mass specific capacitance as a function of current density of an all-solid-state supercapacitor of Example 7.
FIG. 9D is a graph showing energy density as a function of power density of an all-solid-state supercapacitor of Example 7.

The obtained supercapacitor was characterized electro-chemically. Firstly, cyclic voltammetric curves were tested. As shown in FIG. 9a, the curves are quasi-rectangular in shape for different sweep rates in a stable interval from −1 V to 1 V, indicating a good capacitive performance. Then the GCD curves were tested at different current densities. As shown in FIG. 9b, the curves show quasi-triangular peaks, which are consistent with the CV curves and show the characteristics of excellent capacitance. The mass specific capacitance and energy density calculated from the charge/discharge curve are shown in FIG. 9c and FIG. 9d. When the current density is 0.13 A/g, the maximum specific capacity can reach 15.6 F/g and the maximum energy density can reach 8.67 Wh/Kg.

The foregoing descriptions are merely preferred embodiments of the present invention, but are not intended to limit the present invention. Although the present invention has been described in detail with reference to the foregoing embodiments, for a person of ordinary skill in the art, modifications can be made to the technical solutions described in the foregoing embodiments, or equivalent replacements can be made to some technical features in the technical solutions. Any modification, equivalent replacement, or improvement made and the like within the spirit and principle of the present invention shall fall within the protection scope of the present invention.

What is claimed is:

1. An emulsion, being an oil-in-water emulsion, an oil phase being a solution of decane dispersed with an upconversion nanomaterial, and a water phase containing a polymerizable ionic liquid.

2. The emulsion according to claim 1, wherein the upconversion nanomaterial has a hydrophobic oleic acid ligand on the surface thereof and is selected from $NaGdF_4$: $Yb^{3+}$, $Er^{3+}$ and $NaGdF_4$: $Yb^{3+}$, $Er^{3+}$@$NaGdF_4$: $Nd^{3+}$; and wherein the ionic liquid is selected from 1-vinyl-3-tetradecylimidazolium bromide, 1-vinyl-3-dodecylimidazolium bromide, and 1-vinyl-3-butylimidazolium bromide.

3. A method for producing the emulsion according to claim 1, comprising:

dispersing 0.8±0.05 mass % of the upconversion nanomaterial in decane;

adding an aqueous solution of the ionic liquid wherein the concentration of the ionic liquid is 0.36-3.3 mol/L to the dispersion of the upconversion nanomaterial in decane; and reacting for 20-30 h to form an oil-in-water emulsion.

4. An emulsion gel electrolyte, formed by polymerization and cross-linking of the emulsion according to claim 1 and a cross-linking agent in the presence of a photoinitiator;

wherein the cross-linking agent is selected from N'N-methylenebisacrylamide, ethylene glycol dimethacrylate and glycerol dimethacrylate;

wherein the photoinitiator is selected from azo diisobutyronitrile, 4-hydroxybenzophenone and 2,2-diethoxyacetophenone; and wherein a time for initiating polymerization-reaction is 10-30 min.

5. An aerogel, obtained by freeze-drying the emulsion gel electrolyte according to claim 4.

6. An electrode material, being the aerogel according to claim 5.

7. A solid battery, comprising a positive electrode, a negative electrode, and a solid electrolyte provided between the positive and negative electrodes and in contact with the positive and negative electrodes, separately, the solid electrolyte being the emulsion gel electrolyte according to claim 4.

8. A supercapacitor, comprising a positive electrode, a solid electrolyte and a negative electrode, the solid electrolyte being the emulsion gel electrolyte according to claim 4.

9. The supercapacitor comprising a positive electrode, the solid electrolyte and the negative electrode, wherein the positive and negative electrodes are the aerogel according to claim 5.

* * * * *